No. 735,676. PATENTED AUG. 4, 1903.
D. J. RICHARDS.
SYNCHRONIZER.
APPLICATION FILED FEB. 24, 1903.
NO MODEL.
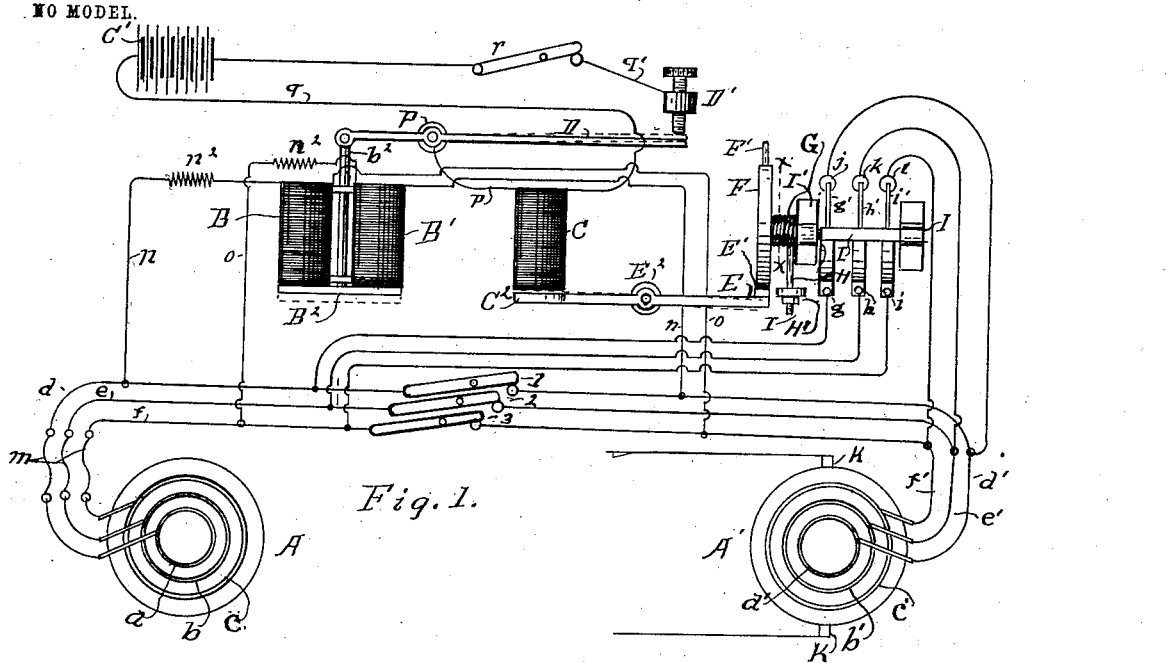
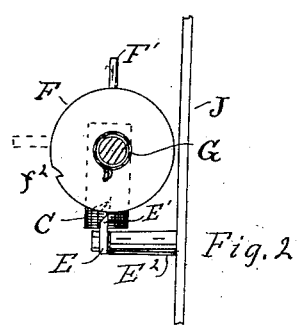
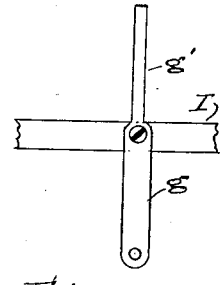
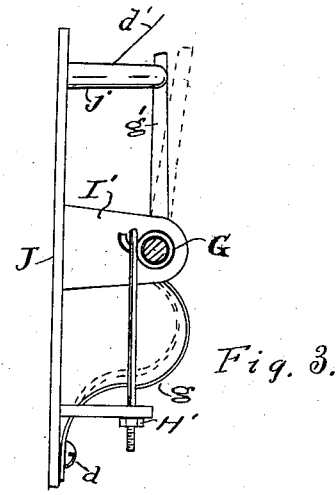
Witnesses
G. H. Aydelotte
John A. Hodges
Inventor
David J. Richards,
By Ithiel J. Cilley
Attorney No. 735,676.  
Patented August 4, 1903.

UNITED STATES PATENT OFFICE.

DAVID J. RICHARDS, OF NEW BALTIMORE, MICHIGAN.

SYNCHRONIZER.

SPECIFICATION forming part of Letters Patent No. 735,676, dated August 4, 1903.

Application filed February 24, 1903. Serial No. 144,883. (No model.)

*To all whom it may concern:*

Be it known that I, DAVID J. RICHARDS, a citizen of the United States, residing at New Baltimore, in the county of Macomb and State of Michigan, have invented certain new and useful Improvements in Synchronizers, of which the following is a specification.

My invention relates to improvements in synchronizers for use in electric systems, and its objects are, first, to connect two alternating-current generators automatically and hold them together until the main switches have been thrown in, and, second, to provide for automatically connecting the main circuit after the voltage of the generators has been equalized. I attain these objects by the mechanism illustrated in the accompanying drawings, in which—

Figure 1 is a plan of my system complete. Fig. 2 is a sectional elevation of the main switch in the synchronizer-circuit looking to the left from line $x\ x$ of Fig. 1. Fig. 3 is the same looking to the right from line $x\ x$ of Fig. 1, and Fig. 4 is a back elevation of the supporting-shaft and an arm of this switch.

Similar characters refer to similar parts throughout the several views.

In the drawings, A represents a three-phase generator, and A' represents a three-phase rotary converter. In cutting in and synchronizing two rotary generators in general use the main switch is cut in when the generator and converter comes in step, and the voltage of electricity generated at 1 2 3 is suddenly transferred to and through the wires $a\ b\ c$ to the switch 4 5 6 and the wires $a'$, $b'$, and $c'$ to the rotary converters 1' 2' 3', transferring the entire load from the generator A to the rotary converter A' suddenly to and over the main wires $a\ b\ c$, connecting them. The closing of the main switch is dependent wholly upon the dexterity of the operator and may or may not be in exact synchronism with the vibrations of the electric circuit, thereby endangering the burning out and destruction of or great injury to the generators. My system for averting this danger consists in lines of wires $d\ e\ f$, shunted from the main-circuit wires $a\ b\ c$, respectively, and passing through the switch $g\ h\ i$ to $d'\ e'\ f'$ to and shunted into the main line $a'\ b'\ c'$ to the rings 1' 2' 3' of the rotary converter A'. The switches $g\ h\ i$ $j\ k\ l$ are automatically closed as follows: The wires $n$ and $o$ are shunted, respectively, from the wires $d$ and $f$. These shunt-wires have in their circuits a proper system of resistance, as indicated at $n^2$, and magnetic coils B' B', whence the wires pass, respectively, to and shunt into the shunt-wires $d'\ f'$, whence the current is carried to the slip-rings 1' 3', through the main wires $a'\ c'$, the circuit thus described connecting the rotary generator A and the rotary converter A' independent of the switch $g\ h\ i\ j\ k\ l$ by a modified current, and by reason of the resistance indicated at $n^2$ and of the magnetic-coils B B' the generator and the converter are connected in parallel by easy degrees, and when the two are in exact step the automatic switches $g\ h\ i\ j\ k\ l$ are closed and the shunt-wires $d\ e\ f\ d'\ e'\ f'$ are energized as follows: At the instant that the generator A and the converter A' are in synchronism the flow of electricity over the magnetic coils B B' will cease, allowing the armature $B^2$ to drop from the poles of the magnets automatically, energizing a separate electric magnetic system, as follows:

The stem $b^2$ of the armature B B' is pivotally connected with the lever D of the independent system, and this lever is pivoted upon the standard P in such a position that its free end may be made to form a switch connection with the post D' by the dropping of the armature $B^2$, which brings the end of the lever in direct contact with the post D', as indicated by the dotted lines, and the electric circuit is completed from the independent battery or generator C' through the magnetic coils C by passing from the generator over the wire $q$ to and over the magnetic coil C, over the wire $p$ to the post P, over the lever D to the post D', and over the wire $q'$ back to the independent generator C' to the armature $C^2$, which will draw the catch E' from the notch $f^2$, when the spring G will throw and hold the main switches $g'\ h'\ i'\ j\ k\ l$ in contact and establish direct circuits over the wires $d\ d'$ or $e\ e'$ and $f\ f'$ and the wires $a\ a'\ b\ b'\ c\ c'$ between the generators A and the converters.

The arrows in Fig. 1 indicate the alternating currents of electricity over the main lines of wires. $r$ represents a temporary switch in the independent circuit and $m\ m\ m$ represent a series of fusible connections established in the main lines of wire to protect the generator and connections and avert the danger of burning out the switches when a heavy current of electricity is thrown on or off.

The switches $g\ h\ i$, &c., can be opened by the operator, if desired, as soon as the main switch has been thrown in. The electromagnets B B' are not only useful, as and for the purpose hereinbefore stated, but are equally valuable as resistance in the electric circuit.

J represents the board or base that supports the switch and independent circuit appliance in the synchronizer.

When the voltage in the generator and converter have been energized to the full desired voltage, the switches represented at 1 2 3, constructed substantially like the switches $g\ h\ i\ j\ k\ l$, may be closed either by the operator or automatically and the main circuit completed over the wires $a\ b\ c\ a'\ b'\ c'$, directly between the generator and the converter, independent of the shunt-wires, and the shunt-wires may be thrown out of circuit by opening the switches $g\ h\ i\ j\ k\ l$.

K K represent direct-current brushes.

Having thus fully described my invention, what I claim as new, and desire to secure by Letters Patent of the United States, is—

1. In an electric synchronizer an electric generator and an electric transformer connected in electric circuits, switch connections in said circuits, electric circuits shunted from and to said main circuits independent of the switch connections, and resistance appliances within said shunted electric circuits, an independent circuit shunted from said resistance an independent battery, and a temporary magnet within said independent circuit, and a lever actuated by said magnet and connected with the switch in the main circuit, substantially as and for the purpose set forth.

2. In combination with electric generators and electric transformers connected in electric circuits, switches in said circuits, electric circuits shunted from and to said main circuits independent of the switches a second circuit shunted from said shunted circuits resistance appliances and electric magnets within said second shunted circuits an armature connected with said magnets and arranged to operate a switch in an independent electric circuit, a generator and electromagnet connected in said independent electric circuit, an armature connected with said electromagnet, a pivoted lever connected with said armature, a catch upon said lever a non-electric-conducting shaft supporting the switches in the shunted circuits, an actuating-lever thereon having a notch in position to engage the catch on the pivoted lever, said pivoted lever actuated by the independent magnet and its armature to relieve the actuating-lever, and a tension spring and regulator connected with the shaft, substantially as and for the purpose set forth.

3. In combination with electric generators and electric transformers connected in an electric circuit, a switch consisting of metallic arms mounted upon a shaft made of a non-electric conductor and post connected with said arms, a tension-spring upon said shaft an adjustable tension-governing rod connected with one end of said spring, an actuating-lever upon said shaft and connected with one end of the tension-spring, said lever having a notch in its periphery, a side electric circuit shunted from and to the main electric circuit between the generator and the converter independent of the main switch, resistance devices and electric magnets in the line of said side circuit, an armature connected with said magnets a rod connecting said armature with a switch-lever of an independent electric-circuit system, an independent generator, an electromagnet and automatic switch in the electric circuit of said generator an armature actuated by said magnet, a pivoted lever attached at one end to said armature and having a catch at the other end in position to engage the main switch-lever when the switches are open substantially as and for the purpose set forth.

Signed at New Baltimore, Michigan, January 31, 1903.

DAVID J. RICHARDS.

In presence of—
ROBT. A. HEATH,
E. J. AUKEN.